H. C. HANSEN.
BAND SAW MILL.
APPLICATION FILED JUNE 11, 1914.

1,169,807.

Patented Feb. 1, 1916.
3 SHEETS—SHEET 1.

Witnesses

H. C. Hansen,
Inventor by

Attorneys

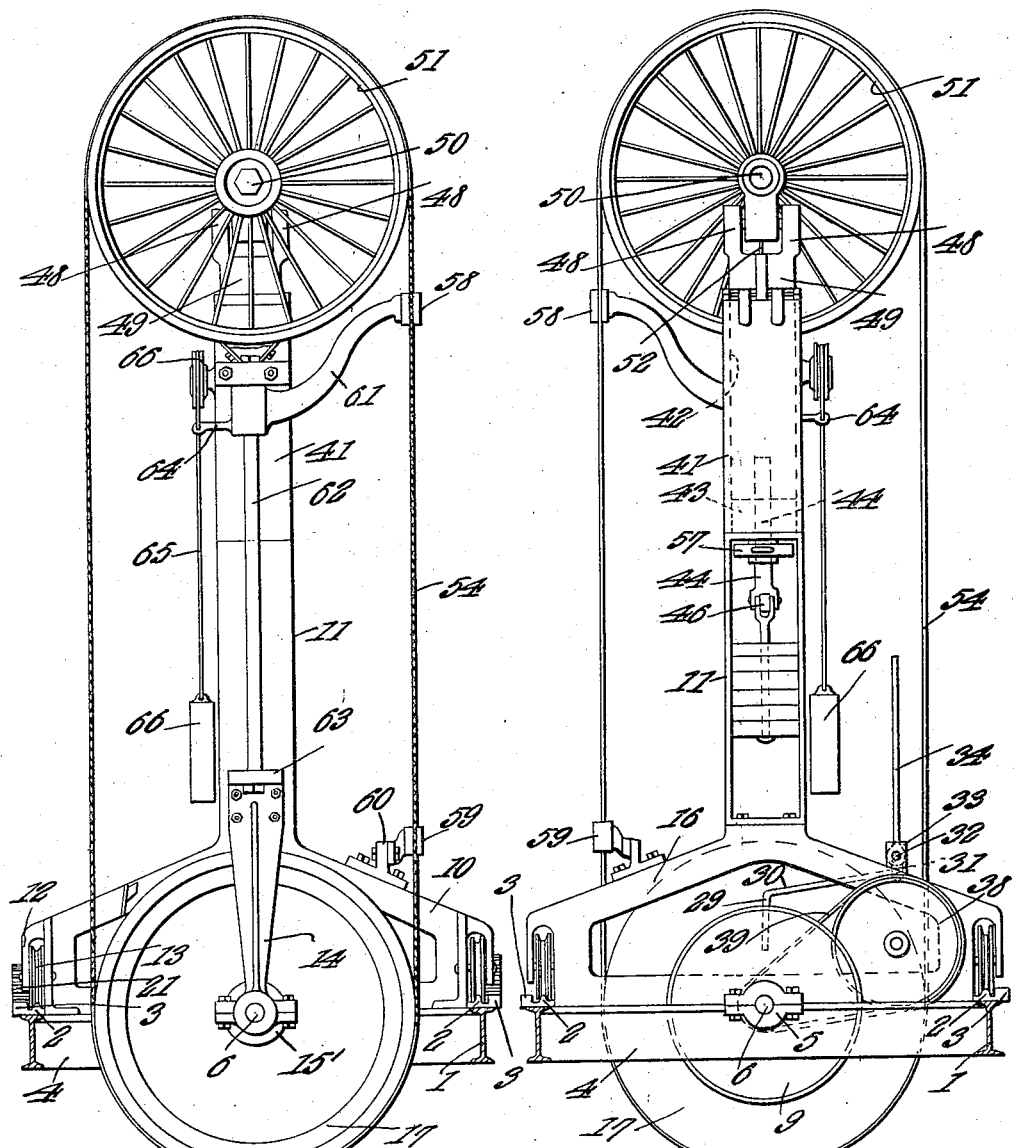

H. C. HANSEN.
BAND SAW MILL.
APPLICATION FILED JUNE 11, 1914.

1,169,807.

Patented Feb. 1, 1916.
3 SHEETS—SHEET 3.

H. C. Hansen,
Inventor

Witnesses by C. A. Snow & Co.
Attorneys

UNITED STATES PATENT OFFICE.

HENRY C. HANSEN, OF HOQUIAM, WASHINGTON, ASSIGNOR TO EAST HOQUIAM SHINGLE COMPANY, OF HOQUIAM, WASHINGTON.

BAND-SAW MILL.

1,169,807.   Specification of Letters Patent.   Patented Feb. 1, 1916.

Application filed June 11, 1914. Serial No. 844,530.

*To all whom it may concern:*

Be it known that I, HENRY C. HANSEN, a citizen of the United States, residing at Hoquiam, in the county of Chehalis and State of Washington, have invented a new and useful Band-Saw Mill, of which the following is a specification.

This invention relates to band saw mills especially designed for use in cutting off shingle blocks.

One of the objects of the invention is to provide a carriage having novel means for feeding it back and forth and for actuating the band saw mounted on the carriage.

A further object is to provide improved means for adjustably supporting the band saw and whereby the said saw is kept taut and properly guided while in use.

With the foregoing and other objects in view which will appear as the description proceeds, the invention resides in the combination and arrangement of parts and in the details of construction herein after described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
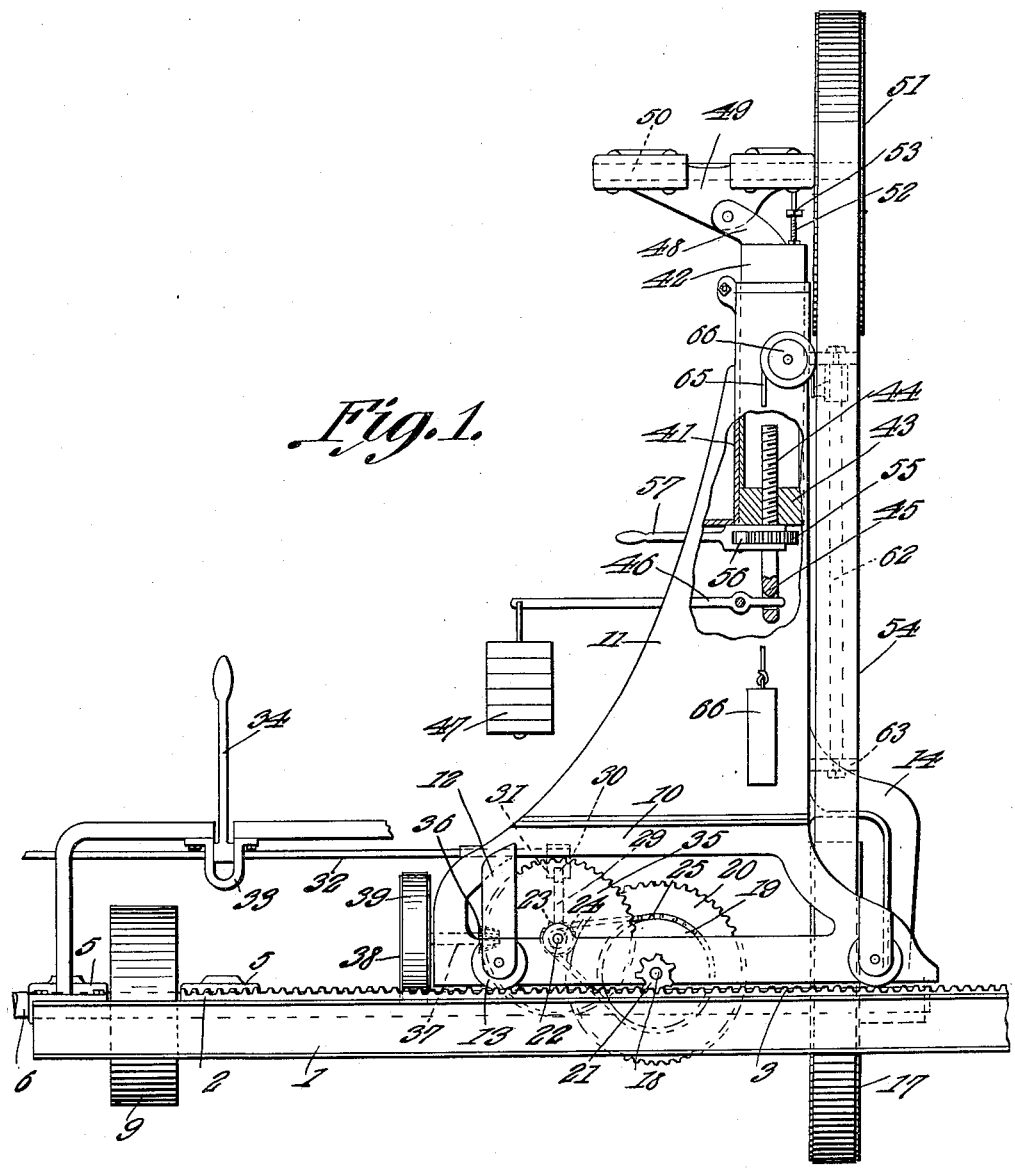
Figure 4:
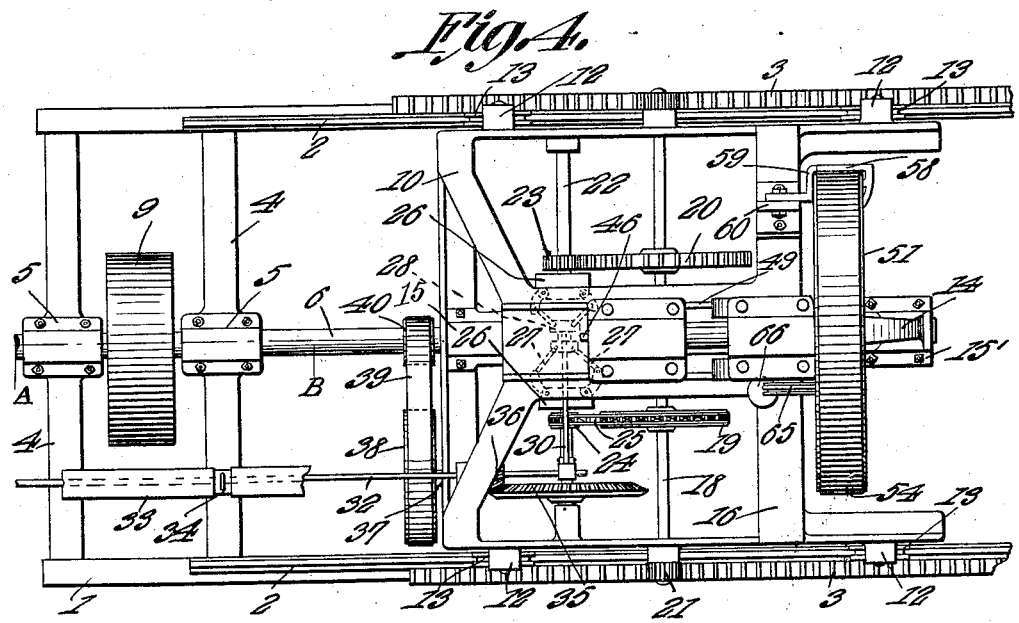
Figure 5:
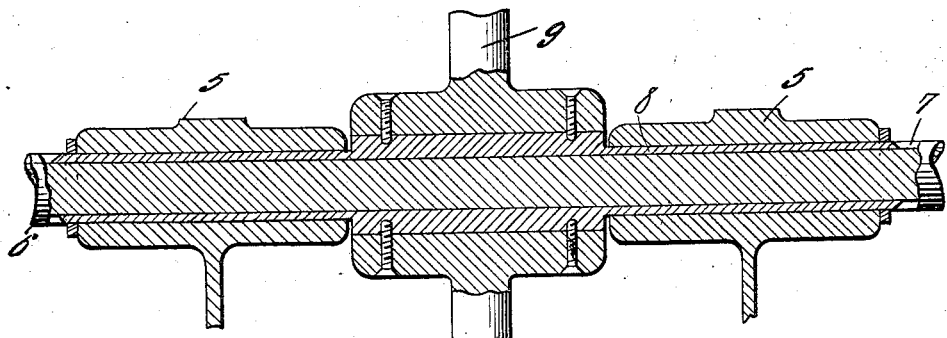

In said drawings:—Figure 1 is a side elevation of a carriage embodying the present improvements, parts being broken away. Fig. 2 is a front elevation of the carriage. Fig. 3 is a rear elevation of the carriage. Fig. 4 is a plan view. Fig. 5 is an enlarged longitudinal section through the hub portion of the saw drive pulley and adjacent parts.

Referring to the figures by characters of reference 1 designates the bed for supporting the carriage, this bed having parallel rails 2 secured thereon, each rail being parallel with and preferably integral with a rack 3 extending along the outer side of the rail.

Cross members 4 form a part of the bed 1 and have bearings 5 in which the main drive shaft 6 is journaled, this shaft being mounted to slide within the bearings as well as to rotate. Said shaft has a keyway 7 and extending into this keyway is a spline 8 which serves to secure a pulley 9 to the shaft so that said shaft and pulley will rotate together without, however, preventing longitudinal movement of the shaft 6 within the pulley. The ends of the spline extend into the bearings 5 as shown in Fig. 5 but do not prevent rotation of the shaft.

The carriage mounted on the bed 1 is made up of a lower frame 10 and an upper frame 11, these two frames being secured together in any suitable manner, the lower frame being provided with side brackets 12 in which are journaled grooved wheels 13 which travel along the rails 2. A forwardly and downwardly extending arm 14 is mounted on the carriage and constitutes an end bearing 15′ for the shaft 6 while additional bearings 15 are provided on the cross members 16 of the lower section 10 of the carriage and in which bearings said shaft 6 is mounted. Secured to the shaft 6 and between one of the bearings 15′ and the end bearing 14 is the lower saw carrying wheel 17. Thus it will be seen that this wheel 17 and the bearings 15 and 15′ coöperate to hold the shaft 6 to the carriage so that, as said carriage moves back and forth, the shaft will travel therewith and be caused to slide back and forth within the pulley 9 and within the bearings 5 hereinbefore described.

Journaled within the sides of the lower section 10 of the carriage is a transverse shaft 18 to which is secured a sprocket 19 and a gear 20. Another smaller gear 21 is secured to each end of the shaft, these gears constantly meshing with the racks 3 so that, when shaft 18 is rotated, the carriage will be caused to travel backward or forward along the rails 2.

An intermediate transverse shaft 22 is journaled in the lower section 10 of the carriage and has a gear 23 constantly meshing with gear 20 and a sprocket 24 which is connected to the sprocket 19 by a chain 25. Gear 23 and sprocket 24 are loosely mounted on the shaft 22 but each is provided with a clutch member 26. These clutch members are provided with shifting arms 27 extending from a collar 28 which, in turn, is engaged by an arm 29 depending from a transverse rod 30. This rod is pivotally connected to a crank arm 31 secured to a rod 32 which is movable with the carriage and is slidably mounted within a guide 33 fixedly connected to the bed 1. A lever 34 is feathered on the rod 32 and is held against lateral movement by the guide 33. By means of this lever, rod 32 can be rotated so as to shift the rod 30 toward either side of the carriage and thus couple either the gear 23 or the sprocket 24 to the shaft 22. Inasmuch as the specific clutch structure constitutes no part of the present invention, it has not been deemed necessary to describe or illustrate the same in detail.

A bevel gear 35 is secured to and rotates with the shaft 22 and is constantly in mesh with a small bevel gear 36 secured to a short shaft 37 journaled in the lower section 10 of the carriage. This shaft has a pulley 38 secured to it and adapted to receive motion through a belt 39 from a small pulley 40 secured to the shaft 6.

Formed in or secured to the upper portion of the upper section 11 of the carriage is a tubular guide 41 in which is mounted a cylindrical slide 42, the lower end of which is closed as shown at 43 and is in engagement with an adjusting screw 44. The lower portion of this adjusting screw is formed with an eye 45 engaging the short arm of a lever 46 which is fulcrumed within the carriage, the long arm of the lever carrying a weight 47. Thus it will be seen that the weighted lever 46 constantly exerts an upward pressure against the slide 42.

Extending from the upper end of the slide is a bracket 48 on which a head 49 is pivotally mounted, this head constituting a support and bearing for the shaft 50 of the upper wheel 51 of the saw. This head can be adjusted angularly relative to the slide by means of an adjusting screw 52 which is threaded into the upper end of the slide 42 and bears upwardly against one end of the head 49, said screw having an angular enlargement 53 adapted to be engaged by a wrench whereby the screw can be rotated readily for the purpose of adjusting the head. The band saw has been indicated at 54 and is mounted upon the two wheels 17 and 51. As the weighted lever 46 presses upwardly against the slide 42, it will be seen that the saw 54 will be held taut at all times. The screw 44 can be adjusted within the end of the slide 42 by disengaging lever 46 from eye 45. A ratchet wheel 55 is secured to this screw and is engaged by a pawl 56 carried by a lever 57. Thus by oscillating said lever the screw 44 can be adjusted upwardly or downwardly after which lever 46 can be replaced in engagement with the eye 45.

The active flight of the saw 54 travels between upper guide blocks 58 and lower guide blocks 59. These lower guide blocks are supported by a bracket 60 secured upon the bottom section 10 of the carriage, while the upper guide blocks 58 are carried by an arm 61 slidably mounted on a guide rod 62. This guide rod is mounted at its ends in ears 63 outstanding from the carriage and a finger 64 extends from and moves with the arm 61 and is secured to one end of a cord 65 or other flexible element extended over a guide sheave 66 journaled on one side of the carriage section 11. A weight 66 is attached to the hanging portion of this connection 65 and thus serves to hold the arm 61 normally raised to its uppermost position. However, should the downwardly moving flight of the saw frictionally engage the blocks 58 to such an extent as to tend to pull them downwardly, weight 66 will allow this downward movement of the blocks without causing the saw to break.

Importance is attached to the particular means employed for adjusting wheel 51 relative to wheel 17, thus to hold the saw taut and to keep the two wheels in the same plane. While the weighted lever 46 will in itself take up any ordinary slack in the saw, should there be excessive slack, the same can be taken up by first adjusting the screw 44 in the manner hereinbefore described and then connecting the lever 46 to the screw. Angular adjustment of the wheel 51 to bring it into the same plane with the wheel 17 is effected by means of the screw 52 in the manner hereinbefore set forth.

Under normal conditions shaft 6 is rotating and motion is thus transmitted through the pulley 40, belt 39 and pulley 38 to shaft 37 which, in turn, transmits motion through the gears 36 and 35 to shaft 22. As the gear 23 and sprocket 24 are normally loose on the shaft 22 it will be apparent that rotation of the shaft under these conditions will not result in the movement of the carriage. When it is desired to move the carriage in one direction, lever 34 is shifted toward one side, thus throwing one of the clutch members 26 so as to couple either the gear 23 or the sprocket 24 to shaft 22. If gear 23 is coupled to said shaft, the gear 20 will be actuated and the carriage will be caused to move in one direction. If, however, sprocket 24 should be coupled to shaft 22, motion will be transmitted therefrom through chain 25 to sprocket 19 and shaft 18, thereby driving the carriage in the opposite direction. It will be noted that the racks 3 do not extend to the ends of the rails 2. Instead the gears 23 will arrive at the ends of the racks before the wheels 13 arrive at the ends of the rails 2. Consequently there is no danger of the carriage being forced off of the ends of the rails.

What is claimed is:—

1. The combination with parallel rails and a rack adjacent and parallel with each rail, of a carriage mounted to travel along the rails, a wheel mounted on the carriage, a shaft connected to said wheel and movable with the carriage, said shaft being parallel with the rails, a drive pulley feathered on said shaft, means operated by said shaft for engaging the racks and driving the carriage in either direction along the rails, said means including reversing mechanism, and means held against movement with the carriage, for actuating the reversing mechanism.

2. The combination with parallel rails and a rack adjacent and parallel with each rail, of a carriage mounted to travel along the rails, a wheel mounted on the carriage, a shaft connected to said wheel and movable with the carriage, said shaft being parallel with the rails, a drive pulley feathered on the shaft, fixed bearings supporting the shaft and constituting means for holding the pulley against longitudinal movement with the shaft, a transverse shaft journaled on the carriage, gears revoluble therewith and engaging the racks, a pulley feathered on the drive shaft, means for transmitting motion therefrom in either direction to the gears, said means including a clutch, and means held against movement with the carriage for actuating the clutch.

3. The combination with parallel rails and a rack adjacent and parallel with each rail, of a carriage mounted to travel along the rails, a drive shaft extending from and movable with the carriage, said shaft being parallel with the rails, a wheel revoluble with the shaft and movable with the carriage, stationary bearings slidably engaged by the shaft, a drive wheel feathered on said shaft and held against movement with the shaft by the bearings, a transverse shaft journaled in the carriage, gears carried thereby and engaging the racks, a wheel driven by the drive shaft and movable with the carriage, means for transmitting motion from said wheel to the transverse shaft, reversing mechanism for shifting said means whereby the carriage can be moved in either direction, said mechanism including clutches, a revoluble rod for actuating the clutches, a bracket slidably engaged by the rod, and a lever feathered on the rod and held against movement therewith by the bracket.

In testimony that I claim the foregoing as my own, I have hereto affixed my signature in the presence of two witnesses.

HENRY C. HANSEN.

Witnesses:
L. H. BREWER,
M. M. KUENEKE.

Copies of this patent may be obtained for five cents each, by addressing the "Commissioner of Patents, Washington, D. C."